No. 637,649. Patented Nov. 21, 1899.
W. NEWBY.
LAWN MOWER.
(Application filed July 21, 1898.)
(No Model.) 3 Sheets—Sheet 1.

WITNESSES
INVENTOR
W. Newby.
BY
ATTORNEYS.

No. 637,649. Patented Nov. 21, 1899.
W. NEWBY.
LAWN MOWER.
(Application filed July 21, 1898.)
(No Model.) 3 Sheets—Sheet 3.

WITNESSES:
Donn Twitchell

INVENTOR
W. Newby.
BY Munn & Co
ATTORNEYS.

UNITED STATES PATENT OFFICE.

WILLIAM NEWBY, OF PITTSBURG, PENNSYLVANIA, ASSIGNOR OF ONE-HALF TO CHARLES E. NEWBY, OF SAME PLACE.

LAWN-MOWER.

SPECIFICATION forming part of Letters Patent No. 637,649, dated November 21, 1899.

Application filed July 21, 1898. Serial No. 686,528. (No model.)

*To all whom it may concern:*

Be it known that I, WILLIAM NEWBY, of Pittsburg, in the county of Allegheny and State of Pennsylvania, have invented a new and Improved Lawn-Mower, of which the following is a full, clear, and exact description.

The object of my invention is to provide a lawn-mower especially adapted for cutting the grass at the edges of grass-plots or close to growing plants and to provide a mower of this description which will be exceedingly effective in operation and simple, durable, and economic in construction.

A further object of the invention is to so construct the mower that the cutters may be adjusted at any desired angle relative to the ground, the adjustment being conveniently and expeditiously accomplished.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
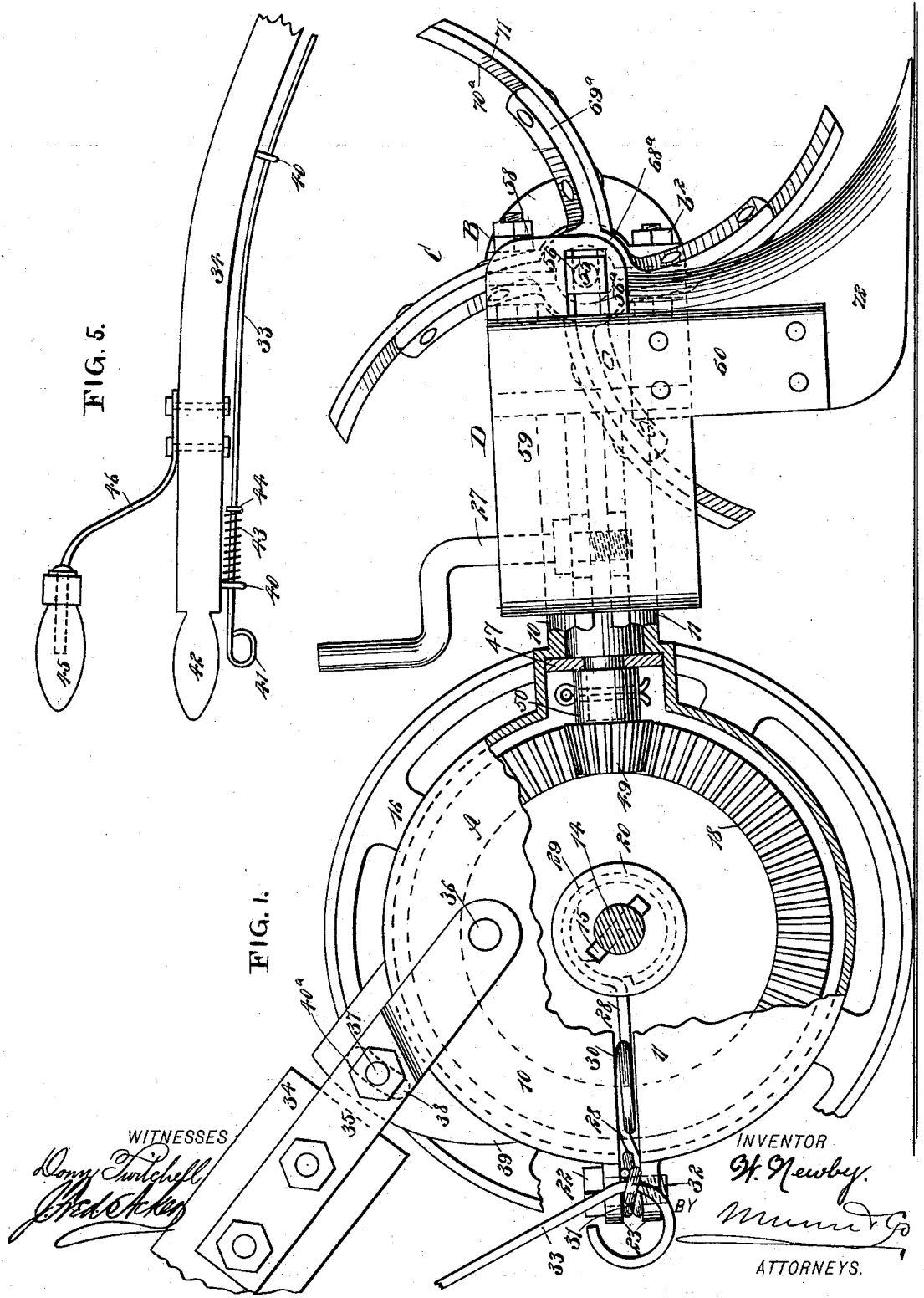
Figure 2:
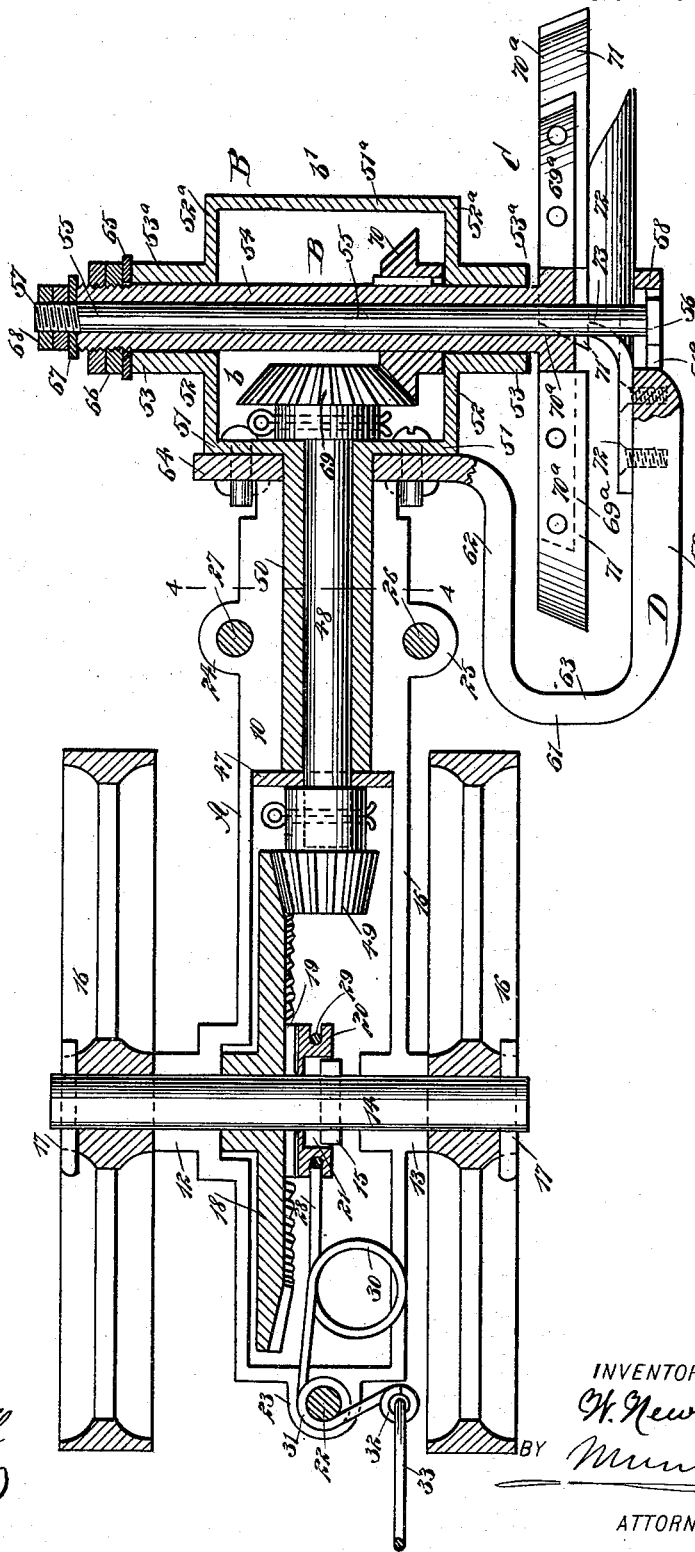
Figure 3:
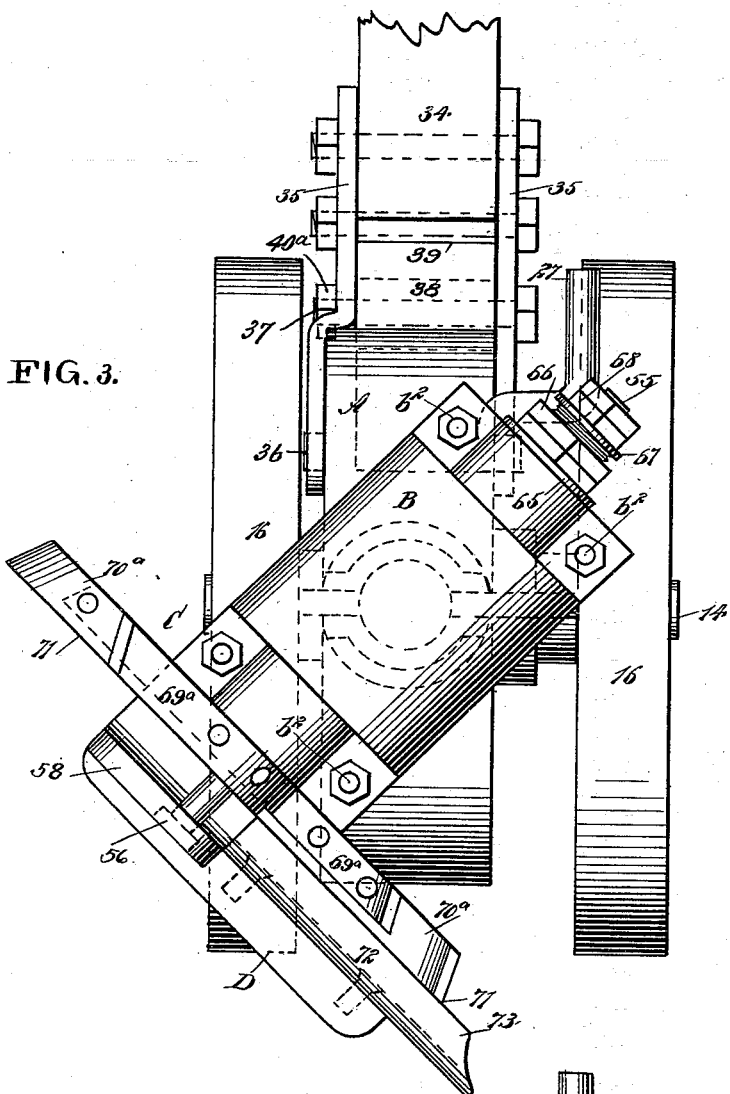
Figure 4:
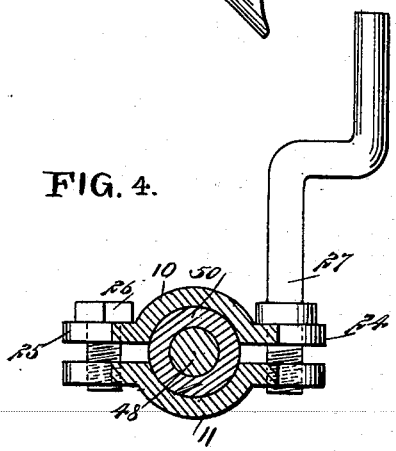

Figure 1 is a side elevation of the improved mower, the handle being broken off and a portion of the side casing being broken away, the axle of the machine being in section. Fig. 2 is a horizontal section through the improved machine. Fig. 3 is a front elevation thereof, showing the handle broken away and illustrating the manner in which the cutters may be adjusted relative to the surface over which they are to pass. Fig. 4 is a transverse vertical section taken substantially on the line 4 4 of Fig. 2, and Fig. 5 is a side elevation of that portion of the handle omitted in the other views.

A represents a box-casing, which box-casing is preferably constructed in two parts— namely, an upper section 10 and a lower section 11. The box-section at its rear is much larger than at its front. In fact, the side portions of the box-casing at the rear are of disk form, whereas the forward portion of the casing, which extends from the center of the rear portion, is of cylindrical construction. At each side of the rear portion of the box-casing A a bearing is formed at the center, said bearings being designated as 12 and 13, respectively, and within these bearings the axle 14 of the mower is adapted to revolve. The axle at or near its center is provided with a key 15, extending through it and beyond opposite sides, as shown particularly in Fig. 2, and at each end of the axle, outside of the box-casing, a ground-wheel 16 is secured, the ground-wheels being attached to the axle by means of cotter-pins 17, keys, or like devices.

Within the rear portion of the box-casing A a beveled gear 18 is located and loosely mounted on the axle 14, the inner face of the gear being provided with a clutch-surface 19, adapted to be normally in engagement with a clutch 20, mounted to slide on the shaft and turn therewith. The clutch 20 is usually provided with an opening 21, adapted to receive the key 15 on the shaft. The two sections of the box-casing are usually connected through the medium of a rear bolt 22 and two forward bolts 26 and 27, the forward bolts being located at each side of the forward cylindrical section of the casing. Where the bolts pass through the casing, lugs are formed, the rear lugs being designated as 23 and the side lugs respectively as 24 and 25. The bolt 26, that is passed through the lugs 25, is of ordinary form, as shown in Fig. 4, but the bolt 27 is in the nature of a crank, as shown in the same figure, and the object of constructing the bolt in this manner is to admit of a quick release of the two sections at one side of the cylindrical portion of the box-casing in order that the parts clamped thereby may be readily turned, as will be hereinafter more fully set forth.

A spring shifting rod 28 is provided for the clutch 20. This shifting rod is made of stout spring-wire, which is usually carried around the clutch within a groove 29, as shown in Figs. 1 and 2, and the said rod after leaving the clutch is bent upon itself to form a single horizontal coil 30, extending out through the space between the sections of the casing, and is provided with a second coil 31, carried once around the rear connecting-bolt 22, as shown particularly in Fig. 2, and from the bolt 22 the shifting rod is carried in direction of the right-hand side of the machine and made to terminate in an eye 32. The eye 32 is connected with a rod 33, which is a hand-rod and extends through suitable guides 40 along the lower portion of the handle 34, which handle is connected with the rear portion of the casing at each side through the medium of ears 35, fastened securely to the handle and pivoted to the casing by means of a pivot-pin 36 or its equivalent, and each ear 35 is provided with a pin 37, adapted to have movement in slots 38, made in an extension 39 from the upper rear portion of the box-casing A, as shown in Fig. 1, nuts $40^a$ being screwed upon the pins 37, so that the handle may be adjusted vertically and held in adjusted position.

The hand bar or rod 33 is provided at its rear end with a finger-loop 41, located below a grip extension 42 on the handle 34, as shown in Fig. 5. A spring 43 is coiled around the rod or bar 33, having bearing against one of the guides 40 and against a collar 44, secured on the said rod, the spring 43 serving in connection with the spring shifting bar 28 to hold the clutch 20 normally in engagement with the clutch-face 19 of the beveled gear 18. When, however, the rod or bar 33 is drawn rearwardly, the coil 30 in the shifting rod 28 will be contracted and the clutch will be carried away from the clutch-surface of the driving-gear 18. An auxiliary handle 45 is attached by a shank 46 to the main handle, as shown in Fig. 5, in order that both hands may be employed in guiding the mower.

At the point where the larger portion of the box-casing A connects with the forward smaller portion a washer 47 is located, and a shaft 48 is located within the forward cylindrical portion of the casing, which shaft passes through the washer 47 into the rear larger portion of the casing, at which end of the shaft a beveled pinion 49 is secured, arranged to mesh with the teeth of the driving-gear 18, the hub of the beveled pinion engaging with the aforesaid washer 47. A sleeve 50 is mounted to turn loosely on the shaft 48, but the said sleeve has bearing at its inner end against the washer 47. The two sections of the casing at the forward cylindrical portion embrace the sleeve 50, as shown in Fig. 4, and when these sections are tightened or securely bolted together the sleeve 50 cannot turn, but the shaft 48 will be free to revolve.

The forward end of the sleeve 50 is extended in opposite directions, forming two vertical walls 51, one at each side of the sleeve, and two side walls 52 and front walls 53, extending one in direction of the right-hand side of the machine and the other in direction of the left-hand side of the machine. This construction of the forward portion of the sleeve 50 provides for one section $b$ of an auxiliary box-casing B, the forward section $b'$ of the auxiliary casing being correspondingly formed to the inner section $b$, comprising a front member $51^a$, side members $52^a$, and extension members $53^a$ from the side members $52^a$, the extension members 53 and $53^a$ of the two portions of the auxiliary casing B being so constructed as to form bearings for the end portions of a tubular shaft 54, which shaft is held to turn around a stationary spindle 55, the said spindle being provided with a head 56 at one end, the other end having a threaded surface 57. The head 56 of the stationary spindle is preferably mounted to slide in an opening $56^a$, (shown in Fig. 1,) made in a forwardly-extending ear 58 of a guard D. This guard comprises a right-hand side section 59, having a downward extension 60 at its forward end, a transverse rear section 61, and an inner forwardly-extending section 62, which is connected with a transverse section 64, the said section 64 having an opening through which the sleeve 50 passes, and the section 64 of the guard D is bolted or otherwise secured to the inner vertical sections 51 of the forward box-casing B. Thus the guard provides for a loop 63, in which the cutters C are mounted to revolve. It may here be remarked that the members of the auxiliary box-casing B are connected by bolts $b^2$ or like devices, as shown in Fig. 3.

A washer 65 is in engagement with the outer end of the left-hand bearing of the tubular shaft 54, said shaft being passed through the washer. The left-hand end of the tubular shaft 54 is threaded to receive a lock and a jam nut, both being designated as 66, the lock-nut having a bearing against the washer. A second washer 67 is passed over the threaded end of the fixed spindle 55 to an engagement with the tubular shaft, and a lock and a jam nut 68 are screwed upon the threaded portion of the said spindle to an engagement with the said washer. By tightening the nuts 68 the cutters C, carried by the tubular shaft, will be moved toward a fixed cutter 72, carried by the guard D, and by tightening the nuts 66 the said rotary cutters C will be carried away from the said fixed cutter 72.

A beveled gear 69 is secured upon the forward end of the shaft 48 within the auxiliary casing B, and this beveled gear meshes with a similar gear 70, keyed or otherwise secured upon the tubular shaft 54, whereby motion is communicated to said shaft, and consequently to the cutters carried thereby.

The rotary cutters consist of a hub $68^a$, which is secured firmly to the right-hand portion of the tubular shaft 54, and longitudinally-curved arms $69^a$, which radiate from the hub, and these arms are made to carry longitudinally-curved cutters $70^a$, the said cutting-blades having their transverse surfaces at an obtuse angle to their axis and their cutting edges 71 beveled. As shown in Figs. 1 and 2, the cutting edges of the blades are their longitudinal outer side edges.

The fixed cutter 72 consists of a blade which is attached to the inner face of the outer member of the guard D and to the guard extension 60, the forward edge of the blade being forwardly curved, whereby the one portion of the blade is much wider than the other portion, and the blade-section of the fixed cutter is provided at its upper portion with an inwardly-curved section 73, as is best shown in Fig. 2. This inwardly-curved section 73 constitutes the blade of the fixed section, since its longitudinal edge is the cutting edge and is adapted to be engaged by the cutting edges of the blades of the rotary cutter.

The cutters may be adjusted at any desired angle with reference to the surface over which they are to be passed by simply loosening the crank-bolt 27 and turning the auxiliary casing B to the desired angle, as shown in Fig. 3. When the adjustment of the cutters has been obtained, the crank-bolt 27 is again screwed tightly into place, causing the sections of the main casing A at its cylindrical portion to firmly clamp the sleeve 50. The heel of the blade-section of the fixed cutter is rounded off and rendered smooth, so that the mower will not mar the lawn over which it passes.

Having thus described my invention, I claim as new and desire to secure by Letters Patent—

1. In a mower, cutter-blades radiating from a common center and mounted to revolve, a stationary cutter-blade having a cutting edge turned inward or toward the rotary cutter, a revolving support for the rotating cutter at an angle to the cutting edge of the stationary blade, an adjustable support common to both of the cutters, and auxiliary adjusting devices, one arranged to carry the rotary cutter toward the stationary cutter and the other device acting to separate the two cutters, said auxiliary adjusting devices being carried by said adjustable support, as specified.

2. In a mower, a main frame provided with a driving mechanism, an auxiliary frame adjustably mounted at the forward end of the main frame, a shaft secured in the auxiliary frame, a tubular shaft mounted upon the fixed shaft, being rotated by said driving mechanism, a cutter secured upon the tubular shaft, comprising a hub and rotary blades, a stationary cutter comprising a body portion extending from the auxiliary frame, the forward edge of which body portion is forwardly curved relative to the vertical plane of the axis of the rotary cutter and provided with a cutting portion turned inward toward the rotary cutter, and an adjusting device mounted upon the tubular shaft, having bearing against the auxiliary frame, and a second adjusting device mounted upon the fixed shaft, having bearing against the tubular shaft, as described.

3. In a mower, the combination, with a wheel-supported frame constructed in adjustable sections, a driving mechanism carried by the wheel-supported frame, and a tension-controlled shifting device for said driving mechanism, of an auxiliary frame mounted to turn upon the forward end of the main frame, a fixed shaft carried by the auxiliary frame, a tubular shaft mounted to revolve upon the fixed shaft, a gear connection between the tubular shaft and the driving mechanism of the main frame, a lock and a jam nut located upon the outer end of the tubular shaft, arranged to have bearing against the auxiliary frame, a fixed and a jam nut located upon the outer end of the fixed shaft, arranged to have bearing against the outer end of the tubular shaft, a cutter stationarily attached to the auxiliary frame, the cutting edge whereof extends inward, and a second cutter mounted to rotate in the auxiliary frame, comprising a series of radial blades connected with the inner end of the tubular shaft, as and for the purpose specified.

WILLIAM NEWBY.

Witnesses:
RICHARD T. EALING,
AUGUSTUS G. MACCONNELL.